(12) United States Patent
Guillemain et al.

(10) Patent No.: US 6,175,600 B1
(45) Date of Patent: Jan. 16, 2001

(54) SYSTEM FOR DETECTING THE PRESENCE OF A DIGITAL SIGNAL CARRIER WAVE, AND A RECEIVER INCLUDING SUCH A SYSTEM

(75) Inventors: Christian Guillemain, Sannois; Abdelkrim Ferrad, Puteaux, both of (FR)

(73) Assignee: Alcatel Telspace, Nanterre Cedex (FR)

( * ) Notice: Under 35 U.S.C. 154(b), the term of this patent shall be extended for 0 days.

(21) Appl. No.: 08/855,540

(22) Filed: May 13, 1997

(30) Foreign Application Priority Data

May 14, 1996 (FR) .................................................. 96 05992

(51) Int. Cl.$^7$ .................................................. H04L 27/14
(52) U.S. Cl. ......................... 375/326; 375/340; 455/229
(58) Field of Search .................................. 375/316, 340, 375/323, 325, 326; 455/229

(56) References Cited

U.S. PATENT DOCUMENTS

| | | | |
|---|---|---|---|
| 3,746,993 | * 7/1973 | Ahmed et al. | 375/326 |
| 4,068,174 | * 1/1978 | Svelund | 375/323 |
| 4,338,574 | * 7/1982 | Fujita et al. | 331/1 A |
| 4,554,508 | * 11/1985 | Haque | 455/229 |
| 5,638,406 | * 6/1997 | Sogabe | 375/326 |

FOREIGN PATENT DOCUMENTS

07240765  * 7/1995 (JP) .

OTHER PUBLICATIONS

F. Classen et al, "An All Feedforward Synchronization Unit for Digital Radio", *Personal Communication Freedom Through Wireless Technology,* NJ, May 18–20, 1993, Conf. 43, 18, Institute of Electrical and Electronics Engineers, pp. 738–741.

N. A. D'Andrea et al, "Comparison of Carrier Recovery Methods for Narrow–Band Polyphase Shift Keyed Signals", IEEE Global Telecommunications Conference & Exhibition, CA, Nov. 18–Dec. 1, 1988, vol. 3 of 3, No. 1988, Institute of Electrical & Electronics Engineers, pp. 1474–1478.

M. Oerder et al, Digital Filter and Square Time Recovery.

* cited by examiner

*Primary Examiner*—Temesghen Ghebretinsae
(74) *Attorney, Agent, or Firm*—Sughrue, Mion, Zinn, Macpeak & Seas, PLLC

(57) ABSTRACT

The invention relates to a system for detecting the presence of a carrier wave in a digital signal that is available at a given frequency. The system delivers at least two baseband samples of the digital signal at each symbol time. The system comprises a timing estimator responsive to the baseband samples to deliver an error signal ($\epsilon$) corresponding to the phase error between the clock frequency that is to be recovered and a local clock frequency, and a detector that generates a detection signal indicating that a carrier wave has been detected whenever a level representative of the variance of the error signal ($\epsilon$) reaches a threshold value. The invention is particularly applicable to receivers of signals transmitted in DTMA mode.

16 Claims, 3 Drawing Sheets

SYSTEM FOR DETECTING THE PRESENCE OF A DIGITAL SIGNAL CARRIER WAVE, AND A RECEIVER INCLUDING SUCH A SYSTEM

FIELD OF THE INVENTION

The field of the invention is that of digital communications, in particular by satellite, and the invention relates more particularly to an apparatus for detecting the presence (or absence) of a carrier wave carrying a signal received by a receiver, said carrier wave being modulated by a digital signal at a clock rate, also called a symbol clock.

The invention applies to any type of digital modulation, for example to phase shift modulation (M-PSK for M-state phase shift keying) or more generally to amplitude and phase modulation (M-APSK, for M-state amplitude and phase shift keying), and modulation of the kind used in particular in time division multiple access (TDMA), in frequency division multiple access (FDMA), or in single carrier per change (SCPC) telecommunications.

The invention can apply to detecting a carrier (e.g. of the 2-PSK or the 4-PSK type) before demodulating the received signal, such demodulation consisting of synchronization and decision-making processes that enable the digital signal to be restored, in the context of satellite transmission.

BACKGROUND OF THE INVENTION

In this context, three major problems arise:
- the bandwidth of the carrier can be less than the frequency uncertainties of the satellite link. These uncertainties can originate in various ways: low relative stability of the local oscillators in the frequency transposition equipment, the presence of a Doppler effect, satellite drift, etc. Consequently, it must be possible to accommodate a large frequency difference between the received carrier and the local demodulation oscillator;
- the carrier may be absent or present (transmission in SCPC mode); and
- carrier detection must take place quickly (particularly with DTMA transmission) and reliably, in spite of a bit energy/noise (Eb/No) ratio close to 2 dB without information coding.

More precisely, the detection system of the invention must be capable of being integrated in a receiver that is entirely digital, with detection taking place prior to demodulation, and in spite of unfavorable noise conditions (Eb/No=2 dB). Also, detection must be capable of being performed quickly, with a maximum duration in the vicinity of 100 symbol times.

A system is known for detecting the presence or the absence of a carrier wave based on establishing a phase histogram of the sampled signal. Detecting non-uniformity in the histogram indicates the presence of a carrier wave.

FIG. 1 shows the constellation of a 4-PSK type signal as received, together with the observed phases $\theta_i$. The axes representing the carriers in phase quadrature are referenced P and Q. On each new received symbol (assuming that the clock rate has already been recovered), the difference $\Delta\theta_i = (\theta_i - \theta_{i-1})$ modulo $\pm\pi/4$ is calculated. On the basis of the observed phase differences $\Delta\theta_i$, a histogram of phase differences is constructed as shown in FIG. 2. In this case, the histogram has four classes (4-PSK) and is obtained by incrementing the class corresponding to $\Delta\theta$ and by decrementing by the same amount the class $\Delta\theta_{k-N}$ where N is the analysis window expressed as a number of symbols. In the presence of a signal that is actually being received, as opposed to in the presence of noise, the accumulated phase differences $\Delta\theta_i$ give rise to a difference D (where $D=\Sigma\Delta\theta_{max}-\Sigma\Delta\theta_{min}$) greater than a predefined threshold value.

The drawback of that method is that in the presence of noise or a high level of frequency drift, phase differences are observed to become more uniform and the threshold value is not reached, in spite of a carrier being present. If the threshold value is made smaller, than the false alarm rate becomes too great. Consequently, that method cannot be applied to signals suffering from large amounts of frequency drift between the carrier frequency and the demodulation frequency, or to signals suffering from a large amount of noise.

In addition, that method assumes that the clock has already been acquired, and that is expensive in time.

OBJECTS AND SUMMARY OF THE INVENTION

An object of the present invention is to remedy those drawbacks.

More precisely, one of the objects of the invention is to provide a digital system for detecting the presence or the absence of a signal carrier wave that is present at a given clock frequency, which system combines speed, reliability, operation at a poor Ed/No ratio (close to 2 dB), and is relatively insensitive to drift in the frequency of the carrier wave.

Another object is to provide such a system in which detection reliability depends little on the Eb/No ratio.

A further object is to simplify implementation of such a detection system by combining it with a timing estimator, e.g. of the Oerder and Meyr type.

These objects, and others which appear below, are achieved by a system for detecting the presence of a carrier wave in a digital signal at a given clock frequency, the system comprising means that, at each symbol time, provide at least two baseband samples of the digital signal, and the system comprising:
- a timing estimator responding to the baseband samples to provide an error signal corresponding to the phase error between the clock frequency that is to be recovered and the local clock frequency; and
- detection means generating a detection signal indicating that the carrier wave has been detected, whenever a level representative of the variance of the error signals reaches a threshold value.

Observing a level representative of the variance in the error signal makes it possible to avoid being affected by variations in the error signal over time.

Advantageously, the detection means include a variance calculator for calculating the variance of the error signal.

Preferably, the system of the invention includes means for removing $\pi/2$ phase ambiguity between the timing estimator and the detection means.

Advantageously, the timing estimator is of the Oerder and Meyr type.

The invention also provides a digital signal receiver including such a detection system.

BRIEF DESCRIPTION OF THE DRAWINGS

Other characteristics and advantages of the invention appear on reading the following description of a preferred embodiment, given by way of non-limiting illustration, and with reference to the accompanying drawings, in which.

MORE DETAILED DESCRIPTION

Figure 1:
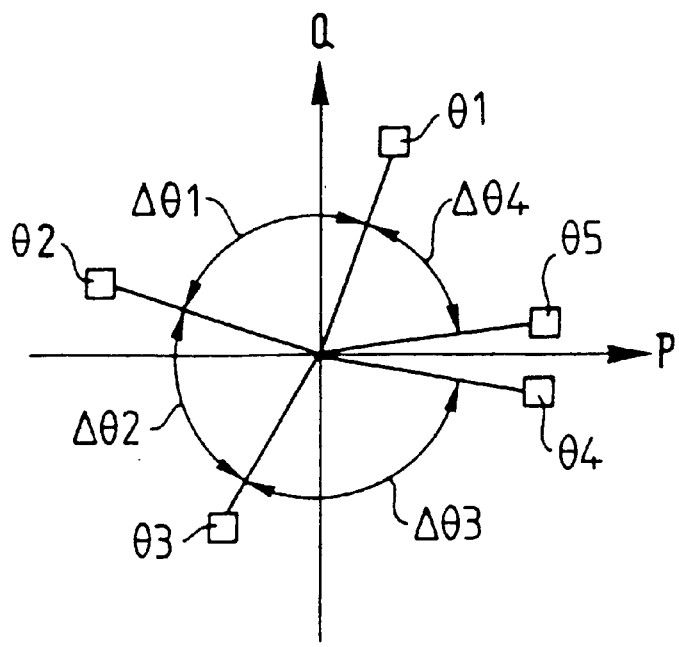
FIG. 1 shows the constellation of a 4-PSK type signal as received together with the observed phases $\theta_i$.
Figure 2:
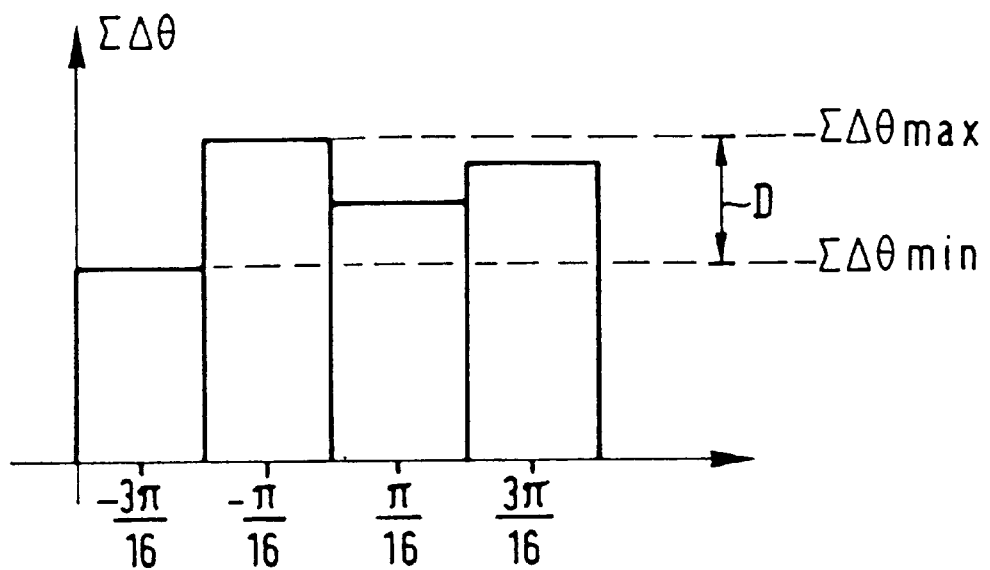
FIG. 2 is a histogram of phase differences obtained from the constellation of FIG. 1.

FIGS. 1 and 2 are described above with reference to the prior art.

Figure 3:
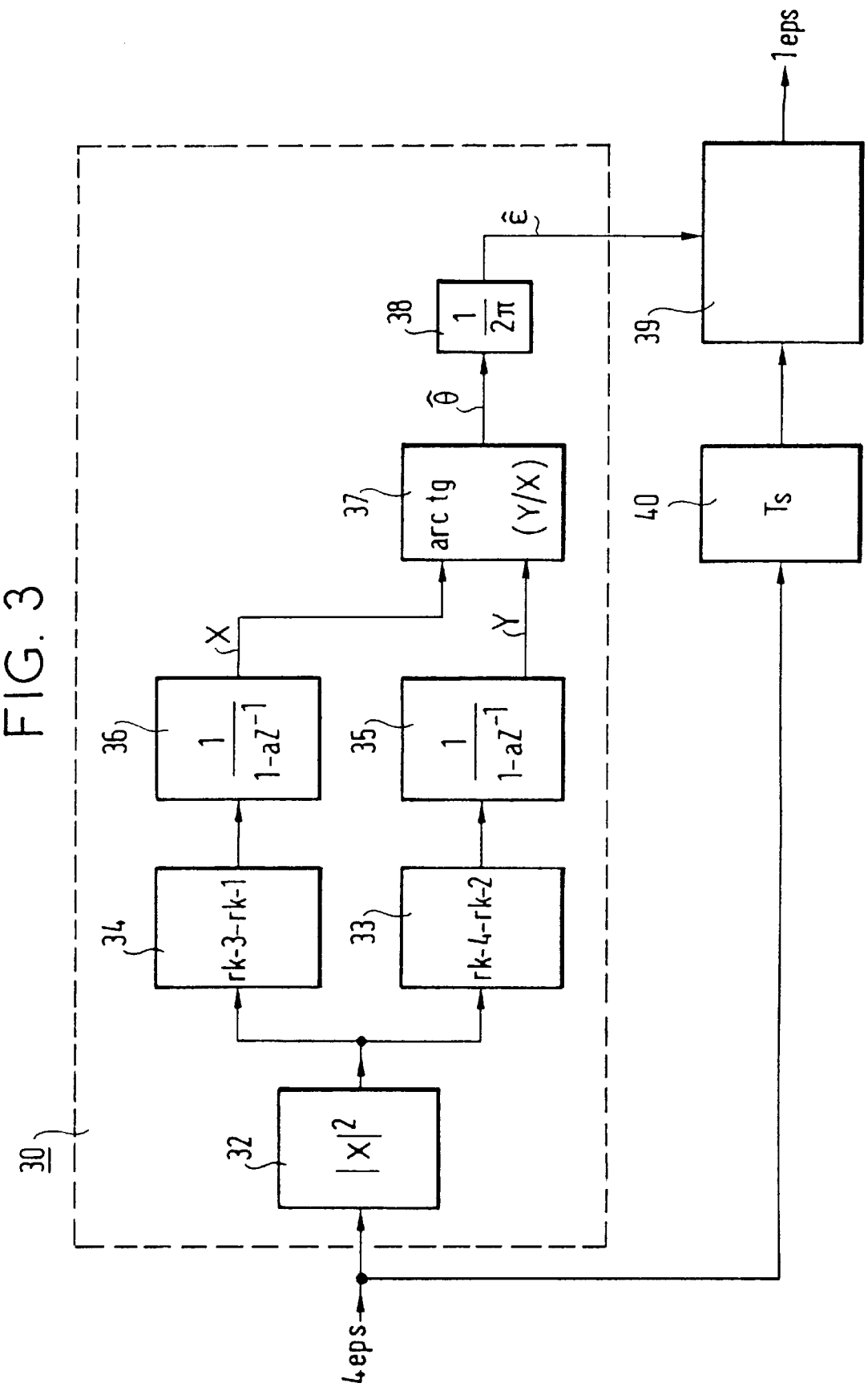
FIG. 3 is a block diagram of an Oerder and Meyr type estimator suitable for use in the system of the invention for detecting the presence of a carrier.

FIG. 3 is a block diagram of a timing estimator of the Oerder and Meyr type suitable for use in a carrier detection system of the invention.

In this figure, the Oerder and Meyr type timing estimator for pointing to the center of the eye of the received signal when transposed to baseband is given overall reference 30. Such an estimator is described in the article entitled "Digital filter and square timing recovery" by Martin Oerder and Heinrich Meyr, Transactions on Communications, Vol. 36, No. 5, May 1988, pp. 605 to 612.

The timing estimator includes means 32 for squaring the modulus of the complex envelope of the digital signal that arrives at a rate of four complex samples per symbol time (4 sps). These samples come from an analog-to-digital converter placed upstream (not shown), or possibly from an interpolator filter that ensures that the number of samples is increased in the event of said number being insufficient after sampling.

The squared samples are applied to a first accumulator means 33, 35 which accumulates differences between the even samples of the squared complex envelope. The means 33 calculates $r_{k-4} - r_{k-2}$ where $r_k$ constitutes one sample, and the means 35 accumulates these differences using the function $1/(1-aZ^{-1})$ where $a$ is a time constant. Accumulation is thus performed by means of an infinite impulse response filter (IFIR) which performs the function of digitally integrating the calculated differences.

Similarly, second accumulation means 34, 36 accumulate the differences between the odd samples of the squared complex envelope. The means 34 calculate $r_{k-3} - r_{k-1}$ and the means 36 accumulate these differences, likewise using the function $1/(1-aZ^{-1})$.

The time reference from which it is decided which samples are even and which samples are odd is arbitrary.

The accumulations 35 and 36 may be performed, for example, over 64 or 128 symbol times (Ts), delivering respective levels Y and X to a calculation module 37 which outputs a phase estimate signal $\hat{\theta}$ equal to arctan(Y/X). The phase estimate signal $\hat{\theta}$ is an error signal corresponding to the phase error between the clock frequency to be recovered and the local clock frequency.

By way of example, the arctan function can be obtained using two techniques:

the first technique consists in making use of a limited expansion of the arctan function over a small range of angles and in taking advantage of the symmetrical properties of said function;

the second technique consists in using a CORDIC algorithm (COordinate Rotation Digital Computer algorithm) serving to determine an angle of rotation by iterations on the basis of Cartesian coordinates, and without requiring the use of multiplication.

Those two techniques make it possible to obtain precision of 16-bit order while using few iterations or little memory space, when compared with directly installing the arctan function in memory.

The phase estimate signal $\hat{\theta}$ is divided by $2\pi$ in a module 38 to provide an estimate $\hat{\epsilon}$ of the phase difference pointing to the eye, to within Ts/8. The estimate $\hat{\epsilon}$ also constitutes an error signal corresponding to the phase error between the clock frequency to be recovered and the local clock frequency, and it is delivered to an interpolator 39 which also receives the four complex input samples once every Ts, via a delay unit 40. The interpolator 39 provides one complex sample per symbol time (1 sps), said complex sample representing information that is free from intersymbol interference on which the final decision is to be taken.

Figure 4:
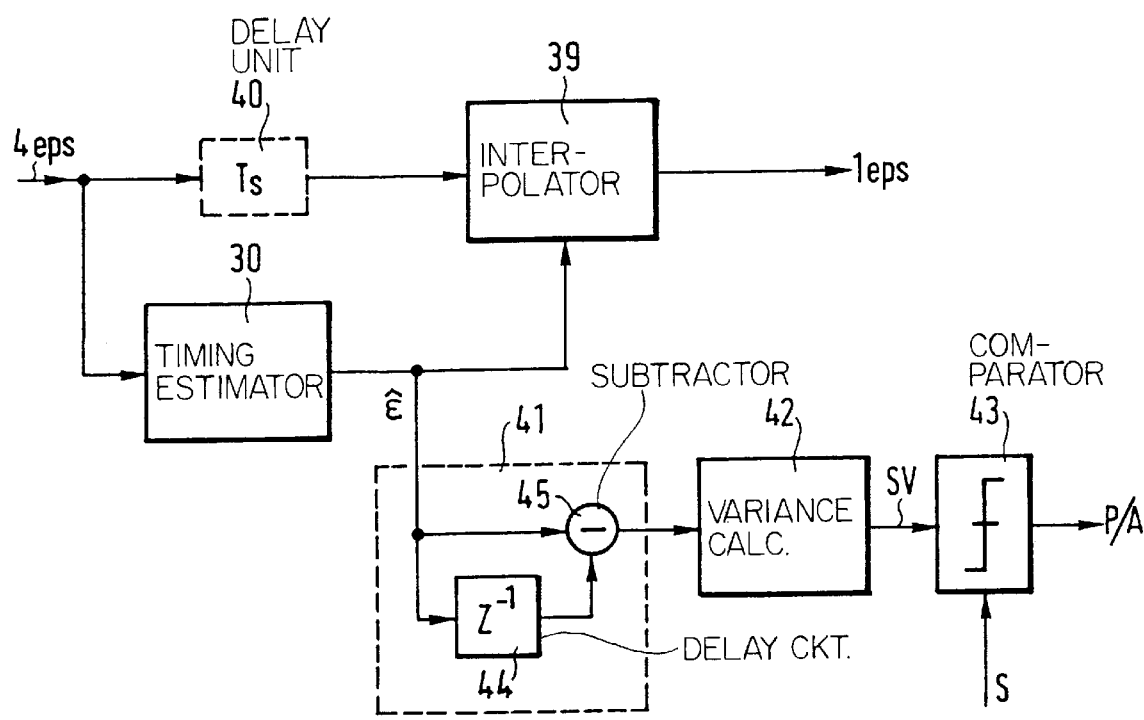
FIG. 4 is a block diagram of a preferred embodiment of the carrier detection system of the invention.

FIG. 4 is a block diagram of a preferred embodiment of the carrier detection system of the invention. Elements identical to those of FIG. 3 are given the same numerical references.

According to the invention, detection means are provided that generate a carrier wave detection signal whenever a level representative of the variance of the error signals reaches a threshold value. In FIG. 4, these means are constituted by a variance calculator 42 for calculating the variance of the error signal $\hat{\epsilon}$ and by a comparator 43 for comparing said variance with a threshold value S.

More precisely, and in a preferred embodiment, the estimate $\hat{\epsilon}$ is calculated over N symbols, i.e. over 4×N samples when the estimator is of the Oerder and Meyr type, and the calculator 42 outputs a sum signal SV given by:

$$SU = \Sigma_n (\hat{\epsilon} - \bar{\epsilon})^2$$

where $\bar{\epsilon}$ is the mean of the estimate +e,cir $\epsilon$ calculated over n×N consecutive symbols.

When the value of the sum signal SV is less than the threshold value S, the comparator 43 provides an output signal A indicating that there is no carrier wave at the clock frequency under consideration. Conversely, when the value of the sum signal SV is greater than the threshold value S, the comparator 43 provides an output signal P indicative of the presence of a carrier wave at the clock frequency under consideration.

The values of N and of $\underline{n}$ are, for example, respectively equal to 256 and to 16. It is advantageous to sum the estimates $\hat{\epsilon}$ in sliding manner, so as to increase the speed of detection.

The threshold value S is determined experimentally, on site, in order to take account of real transmission conditions (selective fading, interference, . . . ). This threshold value S is a function of the amplitude of the carrier and of the clock signal used at the transmitter for sampling the transmitted signal. It is independent of the ratio Eb/No.

Naturally, the variance calculator 42 operating on the error signal $\hat{\epsilon}$ can be replaced by any other calculator that provides a level representative of the variance of said error signals. By way of example, it may provide the standard deviation:

$$\sigma = \Sigma_n (\hat{\epsilon} - \bar{\epsilon})$$

or some power other than 2 of the standard deviation, i.e. $\sigma^\alpha$, where $\alpha$ is equal to 3, 4, or even more. Other functions are also possible, the essential point being to deliver a measure of dispersion in the error signals relative to a reference value.

A unit 41 for removing π/2 ambiguity error is advantageously placed between the timing estimator 30 and the detection means 42, 43. The unit 41 includes a delay circuit 44 of duration equal to the period between two successive estimates $\hat{\epsilon}$ together with a subtracter 45. It supplies the variance calculator 42 with the differences $\hat{\epsilon}_r - \hat{\epsilon}_{-1}$.

The delay unit 40 is optional when clock frequency variations are slow.

The timing estimator 30 may also be of the Mueller and Muller type (in which case two samples are required per symbol time instead of 4) or possibly of the Gardner type. The reference of the timing estimator may be arbitrary, and optionally it may be updated after making each estimate $\hat{\epsilon}$.

Upstream from the timing estimator 30, means are provided for delivering at each symbol time Ts, at least two baseband samples of the received digital signal, said means being constituted either by a sampler on its own, or else by a sampler followed by an interpolator filter, as mentioned above.

Figure 5:
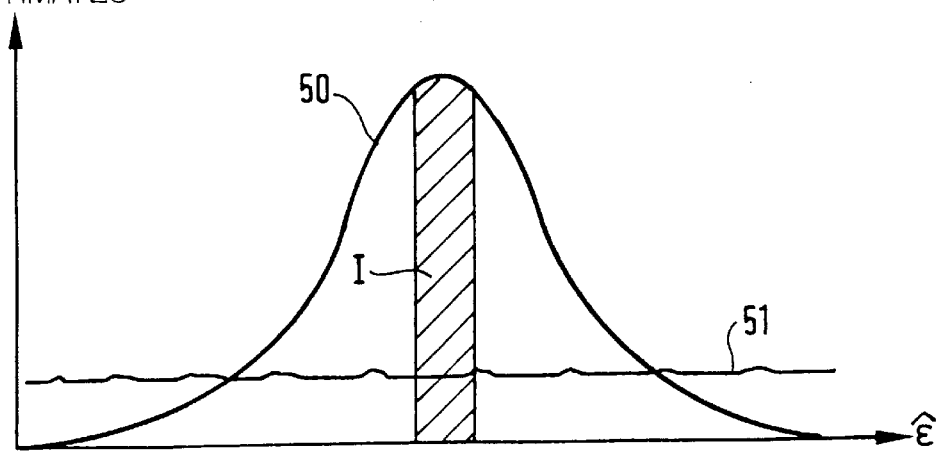
FIG. 5 shows the dispersion characteristics of estimates for $\hat{\epsilon}$.

FIG. 5 shows the dispersion characteristics in the estimates $\hat{\epsilon}$.

Typically, the dispersion in estimates $\hat{\epsilon}$ is of Gaussian type (characteristic curve 50) when detecting the presence of a carrier frequency. Under such circumstances, the fact that the variance of the error signals reaches the threshold value S amounts to considering that the partial integer referenced I of the characteristic curve 50 reaches a threshold value. When no carrier frequency is received, the dispersion of the estimates $\hat{\epsilon}$ is uniform (characteristic curve 51) and the variance thereof is close to 0.

The system of the invention is advantageously estimated with a timing estimator of the Oerder and Meyr type as described above. Clock recovery and detection of the presence of a carrier wave are performed simultaneously.

The invention has the particular advantage of being insensitive to frequency drift in the carrier wave.

Compared with the detection system based on establishing a phase histogram of the sampled signal, the system of the invention is faster since detection processing takes place in parallel with processing for estimating timing, instead of in series therewith (detects timing first and then detects the presence of a carrier). Also, the proposed carrier detection requires only a very small number of samples to be accumulated.

The invention is particularly applicable to DTMA transmission for detecting the presence of a data packet. Detection reliability increases with increasing length of the analysis time interval. The invention is equally applicable to continuous transmission or to SCPC mode transmission, in which case carrier wave detection can be confirmed by a second detection, in order to increase reliability (particularly if Eb/No is close to 0 DB).

The invention is particularly suitable for implementation in the form of an application specific integrated circuit (ASIC) or in the form of a digital signal processor (DSP). By way of example, it is possible to implement a detector to detect the presence or the absence of a carrier wave and a device for recovering timing by means of software within a DSP. As an example, it is possible to use the TMS 320C50 circuit from Texas Instruments (protected trademark) and thus to process signals at rates that may be as much as 200 kbit/s.

The invention also relates to a digital signal receiver including such a detection system.

What is claimed is:

1. A system for detecting the presence of a carrier wave in a modulated digital signal at a clock frequency, said system providing at each symbol time at least two baseband samples of said modulated digital signal, and said system comprising:

a timing estimator responding to said baseband samples to provide an error signal ($\epsilon$) corresponding to a phase error between the clock frequency that is to be recovered and a local clock frequency; and detection means generating a detection signal indicating that said carrier wave has been detected when a level representative of a variance of said error signal reaches a threshold value, said detection means including a variance calculator for calculating the variance of said error signal.

2. A system according to claim 1, wherein said detection means further includes means for removing π/2 phase ambiguity between said timing estimator and said variance calculator.

3. A system according to claim 1, wherein said timing estimator is of the Oerder and Meyr type.

4. A receiver including a system according to claim 1.

5. A system according to claim 3, wherein said means for removing π/2 phase ambiguity further comprises a subtracter and a delay circuit.

6. A system according to claim 1, wherein said timing estimator is of the Mueller and Müller type.

7. A system according to claim 1, wherein said detection means further includes a comparator that outputs a signal indicative of the presence of a carrier wave at the clock frequency under consideration.

8. A system according to claim 7, wherein the signal output by said comparator is based upon a comparison of a sum signal output by said variance calculator and a predetermined threshold value.

9. A system for detecting the presence of a carrier wave in a modulated digital signal at a clock frequency, said system providing, at each symbol time, at least two baseband samples of said modulated digital signal, and said system comprising:

a timing estimator responding to said baseband samples to provide an error signal ($\epsilon$) corresponding to a phase error between the clock frequency that is to be recovered and a local clock frequency; and a detector generating a detection signal indicating that said carrier wave has been detected when a level representative of a variance of said error signal reaches a threshold value, said detector including a variance calculator for calculating the variance of said error signal.

10. A system according to claim 9, wherein said detector further includes a circuit for removing π/2 phase ambiguity between said timing estimator and said variance calculator.

11. A system according to claim 9, wherein said timing estimator is of the Oerder and Meyr type.

12. A receiver including a system according to claim 9.

13. A system according to claim 10, wherein said circuit for removing π/2 phase ambiguity further comprises a subtracter and a delay circuit.

14. A system according to claim 9, wherein said timing estimator is of the Mueller and Müller type.

15. A system according to claim 9, wherein said detector further includes a comparator that outputs a signal indicative of the presence of a carrier wave at the clock frequency under consideration.

16. A system according to claim 15, wherein the signal output by said comparator is based upon a comparison of a sum signal output by said variance calculator and a predetermined threshold value.

\* \* \* \* \*